United States Patent
Panzram et al.

(10) Patent No.: US 9,676,567 B2
(45) Date of Patent: Jun. 13, 2017

(54) CARGO COMPARTMENT AND METHOD FOR LOADING A CARGO COMPARTMENT

(71) Applicants: Airbus Operations GmbH, Hamburg (DE); Airbus S.A.S., Blagnac (FR)

(72) Inventors: Uwe Panzram, Ganderkesee (DE); Joerg Klockgether, Toulouse (FR); Philippe Le Bigot, Blagnac (FR); Peter Esteie, Tournefeuille (FR); Netra Gowda, Toulouse (FR)

(73) Assignees: AIRBUS OPERATIONS GMBH, Hamburg (DE); AIRBUS S.A.S., Toulouse (FR)

( * ) Notice: Subject to any disclaimer, the term of this patent is extended or adjusted under 35 U.S.C. 154(b) by 335 days.

(21) Appl. No.: 14/303,935

(22) Filed: Jun. 13, 2014

(65) Prior Publication Data

US 2014/0377017 A1    Dec. 25, 2014

(30) Foreign Application Priority Data

Jun. 21, 2013  (EP) .................................... 13173310

(51) Int. Cl.
  *B65G 51/03* (2006.01)
  *B65D 88/14* (2006.01)
  (Continued)

(52) U.S. Cl.
  CPC ............... *B65G 51/03* (2013.01); *B64C 1/20* (2013.01); *B64D 9/00* (2013.01); *B65D 88/127* (2013.01);
  (Continued)

(58) Field of Classification Search
  CPC ...................................................... B65G 51/03
  (Continued)

(56) References Cited

U.S. PATENT DOCUMENTS 2,918,183 A * 12/1959 Petersen ................ B65G 51/03
                                                       100/207
3,081,886 A *  3/1963 Flexman .................. B60V 3/04
                                                       104/134
(Continued)

FOREIGN PATENT DOCUMENTS

CN        101554956 A    10/2009
GB          1467486 A     3/1977

OTHER PUBLICATIONS

European Patent Office, Extended European Search Report for European Patent Application No. 13173310.7, mailed Nov. 27, 2013.

*Primary Examiner* — Joseph Dillon, Jr.
(74) *Attorney, Agent, or Firm* — Lorenz & Kopf, LLC

(57) ABSTRACT

A cargo compartment configured to be installed in an aircraft and to accommodate a plurality of cargo receiving devices is provided. The cargo compartment surrounds a compartment interior space, and includes a floor structure arrangement having a floor surface facing the compartment interior space and configured to support cargo receiving devices loaded into the cargo compartment. The cargo compartment includes two opposite side walls extending laterally of the floor structure arrangement away from the floor surface, and the side walls include an entrance opening for access to the compartment interior space. The floor structure arrangement also includes an air cushion device having a plurality of cushion nozzles distributed in the floor surface, and the cushion nozzles are configured to blow air up from the floor surface in a direction perpendicular to the floor surface.

11 Claims, 1 Drawing Sheet

(51) Int. Cl.
*B65D 88/12* (2006.01)
*B65D 88/54* (2006.01)
*B64C 1/20* (2006.01)
*B64D 9/00* (2006.01)

(52) U.S. Cl.
CPC .......... *B65D 88/14* (2013.01); *B65D 88/546* (2013.01); *B65D 2590/0083* (2013.01)

(58) Field of Classification Search
USPC ................ 406/84, 88; 414/676; 244/137.1
See application file for complete search history.

(56) References Cited

U.S. PATENT DOCUMENTS

| | | | | |
|---|---|---|---|---|
| 3,209,929 | A | * 10/1965 | Petersen | B60V 3/025 180/124 |
| 3,616,957 | A | 11/1971 | Patton | |
| 3,717,381 | A | * 2/1973 | Hagler | H01L 21/67784 406/84 |
| 3,975,057 | A | * 8/1976 | Hurd | B65G 51/03 193/40 |
| 2012/0312926 | A1* | 12/2012 | Holzner | B64D 9/00 244/137.1 |
| 2014/0097297 | A1* | 4/2014 | Yanagawa | B64D 9/00 244/137.1 |

\* cited by examiner

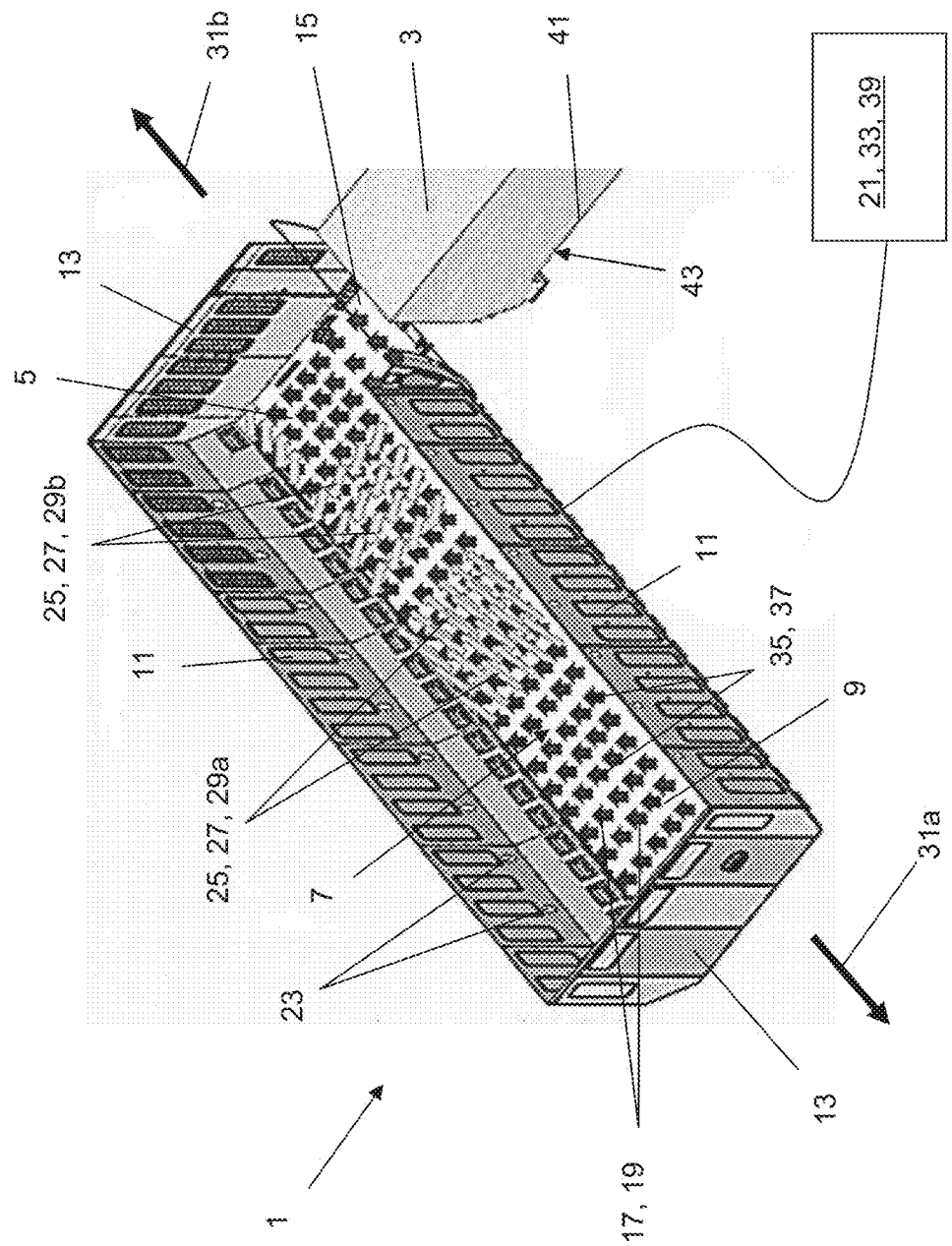

CARGO COMPARTMENT AND METHOD FOR LOADING A CARGO COMPARTMENT

CROSS-REFERENCE TO RELATED APPLICATION

This application claims priority to European Patent Application No. 13173310.7, filed Jun. 21, 2013, which is incorporated herein by reference in its entirety.

TECHNICAL FIELD

The technical field relates to a cargo compartment configured to be installed in a vehicle, such as an aircraft, and to accommodate a plurality of cargo receiving devices. Said cargo compartment defines or surrounds a compartment interior space and comprises a floor structure arrangement and two opposite side walls. The cargo compartment and the interior space are elongate and extend along a longitudinal axis. The floor structure arrangement has an upper floor surface facing the compartment interior space and being configured to support cargo receiving devices loaded into the cargo compartment. When the cargo compartment is installed in a vehicle, the cargo compartment is arranged such that the floor surface is horizontal in the normal operating condition of the vehicle. In case the cargo compartment is elongate, the floor surface extends parallel to the longitudinal axis. The side walls extend laterally with respect to the floor structure arrangement and away from the floor surface and include an entrance opening providing access to the compartment interior space. In case the cargo compartment is elongate, the side walls extend parallel to the longitudinal axis. The technical field also relates to a method for loading a cargo compartment of a vehicle, such as an aircraft, with a cargo receiving device.

BACKGROUND

Cargo compartments adapted to be installed in aircrafts and other vehicles and to accommodate a plurality of cargo receiving devices are known in the prior art. However, the existing cargo compartments are rather difficult to load with cargo receiving devices, as the cargo receiving devices are heavy when loaded with cargo, and the cargo compartments are constructed to be narrow and so as to consume as little space as possible in the aircraft. Complicated equipment and/or devices are often employed to move the cargo receiving devices to a desired position in the cargo compartment.

Therefore, it is desirable to provide a cargo compartment adapted to be installed in a vehicle, such as an aircraft, which simplifies the process of loading or unloading the cargo compartment with cargo receiving devices.

In addition, other objects, desirable features and characteristics will become apparent from the subsequent summary and detailed description, and the appended claims, taken in conjunction with the accompanying drawings and this background.

SUMMARY

A cargo receiving device within the meaning of the current disclosure may be adapted to receive and secure a certain amount of cargo and to be accommodated in the cargo compartment of a vehicle, such as an aircraft. Said cargo receiving device comprises a base structure arrangement having a lower contact surface adapted to abut a floor surface of a cargo compartment, when the cargo receiving device is in a desired position in the cargo compartment. The lower contact surface may be planar, but may also be profiled or include skewed or recessed portions. The cargo receiving device may be e.g. any standard or non-standard Unit Load Device (ULD), such as various containers or pallets. Such ULDs are commonly used to receive passenger luggage or commercial cargo units which are usually packaged separately, but may generally also be bulk.

A cargo compartment within the meaning of the present disclosure may be suitable and/or designed to receive certain kinds or types of ULDs or other cargo receiving devices. Such a cargo compartment may be formed as a longitudinal chamber having two opposite side walls, a floor structure arrangement—and generally also a ceiling and/or two opposite end walls, wherein at least one entrance opening is provided in the side walls. The entrance opening may also be connected to the side walls by a short duct instead of being provided directly in the side walls, such that the entire cargo compartment is formed in L-shape or T-shape. Such cargo compartment is configured to be received in an aircraft or in another vehicle, but must not necessarily be installed in said vehicle, yet. As alternative to an aircraft, the cargo receiving device may be adapted to be installed in e.g. a truck, a train or a ship.

The terms "horizontal" or "vertical" within the meaning of the present disclosure refer to a situation in which the cargo receiving device is positioned and supported on a horizontal surface, e.g. on the floor surface of a cargo compartment installed in a vehicle in such a manner that the floor surface is extending horizontally in the normal operating condition of the vehicle.

According to the various teachings of the present disclosure, provided is a floor structure arrangement comprising an air cushion device having a plurality of cushion nozzles distributed over the floor surface. Said cushion nozzles are configured to blow air from the floor surface into the compartment interior space in a direction perpendicular to the floor surface.

By means of operating the air cushion device in the floor structure arrangement an air cushion is established above the floor surface. The air cushion can be established in such a manner that cargo receiving devices may hover on said air cushion above the floor surface, which considerably facilitates moving cargo receiving devices into the cargo compartment and within the cargo compartment to a desired position, as there is no friction between a cargo receiving device and the floor surface, which has to be overcome. Thus, cargo receiving devices can be easily moved manually or by means of a suitable transport device through the cargo compartment while being supported on the air cushion.

In combination with one or more cargo receiving devices as described above the above-described cargo compartment forms a system for loading and unloading said cargo compartment with cargo receiving devices.

In one embodiment the air cushion device comprises one or more position sensors and a cushion controlling unit connected to the position sensors. The position sensors are configured to detect the position of a cargo receiving device in the cargo compartment. The cushion controlling unit is configured to control the air stream blowing out of the cushion nozzles in dependence of the position of the cargo receiving device detected by said position sensors.

By means of such positions sensors and the cushion controlling unit it is generally possible to control the cushion nozzles in such a manner that only or essentially only those cushion nozzles are operated over which a cargo receiving device is positioned at that time. Energy may be saved in such a way, and unnecessary air streams may not bother people or equipment in the cargo compartment.

In one embodiment the cargo compartment comprises a transport device configured to transport a cargo receiving device through the cargo compartment along the floor surface to a desired position. Such transport device may be e.g. a mechanical transport device such as a rope, a gear system or a wheel system driven by an electric motor or a hydraulic or pneumatic actuator, or may be an electromagnetic linear motor. Alternatively, the cargo transport device may be moved manually, i.e. pushed or pulled, by a person.

In particular, it is preferred that the transport device comprises a plurality of transport nozzles provided in the floor structure arrangement and distributed over the floor surface. Said transport nozzles are configured to blow air from the floor surface into the compartment interior space in a direction inclined between a direction perpendicular to the floor surface, in particular the vertical direction, and a direction in which a cargo receiving device is intended to be moved, parallel to the floor surface in particular the horizontal direction—and generally parallel to the longitudinal axis of an elongate cargo compartment. The air stream blowing in an inclined direction may be obtained by the transport nozzles being installed in said inclined direction. In addition or alternatively it is also possible to provide the transport nozzles in the side walls, wherein the air stream may engage e.g. the side walls of a container-shaped cargo receiving device.

Thus, by operating the transport nozzles a cargo receiving device can be transported through the cargo compartment by means of air streams inclined to the intended moving direction and engaging a lower contact surface of the cargo receiving device while being supported on the air cushion. Said lower contact surface may be of a flat, planar configuration, but may also be provided with a certain profile improving engagement of the air streams blown out of the transport nozzles.

It is further preferred that a first group of transport nozzles is configured to blow air from the floor surface in a direction inclined between the direction perpendicular to the floor surface and a first direction parallel to the floor surface and generally extending along the longitudinal axis of an elongate cargo compartment. At the same time a second group of transport nozzles is configured to blow air from the floor surface in a direction inclined between the direction perpendicular to the floor surface and a second direction parallel to the floor surface opposite to said first direction.

By means of such transport nozzles inclined to opposite directions a cargo receiving device may be moved in opposite directions, such as in and out of the cargo compartment or towards and away from, a desired position in the cargo compartment. In this regard, it is to be noted that more than one second group of transport nozzles may be advantageously provided, wherein the second groups differ in the orientation of the first and second directions in order to allow transport of cargo receiving devices in more than one back-and-forth direction. For example, in the case of an elongate cargo compartment it is preferred that the transport nozzles are configured such that they can be moved both along the longitudinal axis and transversely to the longitudinal axis, e.g. in order to position two or more cargo receiving devices next to one another in a direction between the sidewalls perpendicular to the longitudinal axis.

In one embodiment the transport nozzles are configured to be operable to adjust the direction in which air is blown between two directions. One direction is inclined between the direction perpendicular to the floor surface and a first direction parallel to the floor surface, along the longitudinal axis of an elongate cargo compartment. The other direction is inclined between the direction perpendicular to the floor surface and a second direction parallel to the floor surface opposite to said first direction. The transport nozzles are generally adjustable between these directions in a continuous manner, or via a plurality of steps including a position perpendicular to the floor surface.

By means of such adjustable transport nozzles a cargo receiving device may be moved in opposite directions without having to fixedly provide differently oriented or configured transport nozzles. Thus, the flexibility is increased and the number of necessary transport nozzles may be reduced.

In one example, it is preferred that the cushion nozzles are formed as transport nozzles, i.e. that at least some of the transport nozzles also constitute cushion nozzles or can be operated as cushion nozzles. As the inclination angle of the transport nozzles is adjustable also to a position, in which air is blown in the direction perpendicular the floor surface, the transport nozzles may take over the function of the cushion nozzles, so that cargo receiving devices can be supported and moved at the same time by the transport nozzles continuously adjusting their angle of inclination.

According to one embodiment the transport device comprises one or more position sensors and a transport controlling unit connected to the position sensors. The position sensors are configured to detect the position of a cargo receiving device in the cargo compartment. The transport controlling unit is configured to control the air stream, e.g. the mass stream and/or the velocity of the air, and the direction of the air blowing out of the transport nozzles in dependence of the position of a cargo receiving device detected by said position sensors.

In such a manner cargo receiving devices may be supported and moved at the same time by the transport nozzles continuously adjusting their angle of inclination, while only or essentially only those nozzles are operated, above which a cargo receiving device is located at that time.

According to one embodiment the cargo compartment comprises a locking device configured to lock a cargo receiving device in a desired position in the cargo compartment. This might be, e.g., a mechanical locking device including two corresponding members configured to engage one another and driven by an electric hydraulic or pneumatic drive, or a magnetic or electromagnetic locking device. By means of a locking mechanism a cargo receiving device may be locked fixedly in its desired position during movement of the vehicle.

In one example, it is preferred that the locking device comprises a plurality of vacuum suction nozzles arranged in the floor structure arrangement and distributed over the floor surface. Said vacuum suction nozzles are configured to suck off air from above the floor surface. Thus, a vacuum can be established between a cargo receiving device and the floor surface, whereby the cargo receiving device is pressed onto the floor surface and friction between the lower contact surface and the floor surface is increased immensely, so that the cargo receiving device can be fixedly held to the floor surface in its desired position.

Further, it is preferred that the locking device comprises one or more position sensors and a locking controlling unit connected to the position sensors. The position sensors are configured to detect the position of a cargo receiving device in the cargo compartment. The locking controlling unit is configured to control the suction action of the vacuum suction nozzles, e.g. by controlling the vacuum pressure inside the vacuum suction nozzles, in dependence of the position of the cargo receiving device detected by said position sensors.

Thus, it is possible that only or essentially only those vacuum suction nozzles located at a respective desired position of a cargo receiving device are operated to apply the vacuum, so that only those cargo receiving devices are locked which have reached their desired positions.

According to one embodiment the vacuum suction nozzles are incorporated in the cushion nozzles and/or the transport nozzles. This means that the cushion nozzles and/or the transport nozzles may not only blow out air into the compartment interior space in order to support and/or transport a cargo receiving device, but also suck air in so as to apply a vacuum under a cargo receiving device and lock the cargo receiving device in its desired position. In this manner, the total number of nozzles requires can be reduced.

One of various aspects of the present disclosure relates to a method for loading a cargo compartment of a vehicle, such as an aircraft, with a cargo receiving device, comprising: providing a cargo compartment according to one or more of the embodiments described above; providing a cargo receiving device configured to receive and secure a certain amount of cargo and to be accommodated in the cargo compartment of an aircraft, said cargo receiving device comprising a base structure arrangement having a lower contact surface configured to abut the floor surface of the cargo receiving device; establishing an air cushion above the floor surface of the cargo compartment by initiating the air cushion device to blow air out of the cushion nozzles into the compartment interior space; positioning the cargo receiving device in the cargo compartment with the lower contact surface on said air cushion spaced from the floor surface, e.g. by means of a cargo conveyer device; and moving the cargo receiving device on the air cushion to a desired position in the cargo compartment, e.g. manually or by means of a transport device.

The same embodiments and advantages as described above in connection with the cargo compartment apply for the method in a corresponding way, e.g. the air cushion device may be controlled by a cushion controlling unit.

Alternatively, the air cushion may be established after the cargo receiving device is positioned on the floor surface of the cargo compartment.

According to one embodiment moving the cargo receiving device on the air cushion to a desired position in the cargo compartment is performed by means of a transport device as described above. By means of the transport device the inclined stream of air blowing out of the transport nozzles engages the lower contact surface of the cargo receiving device and pushes said cargo receiving device in the desired direction along the longitudinal axis.

According to one embodiment, subsequent to moving the cargo receiving device on the air cushion to a desired position in the cargo compartment, the cargo receiving device is locked in its desired position by means of a locking device as described above. By means of the locking device vacuum suction is applied by the vacuum suction nozzles between the lower contact surface of the cargo receiving device and the floor surface. As a result, the lower contact surface is pressed onto the floor surface, thereby increasing the friction so that no movement of the cargo receiving device is possible.

For unlocking the cargo receiving device the before described method may be carried out in reversed sense.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing FIGURES, wherein like numerals denote like elements, and wherein:

FIG. 1 is a perspective view of an embodiment of the cargo compartment.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

FIG. 1 illustrates an embodiment of the cargo compartment 1 according to the present disclosure. Said cargo compartment 1 is configured to be installed in an aircraft and to accommodate a plurality of cargo receiving devices 3. The cargo compartment 1 surrounds a compartment interior space 5, and comprises a floor structure arrangement 7 having a floor surface 9, two opposite side walls 11, and two opposite end walls 13.

The side walls 11 extend laterally with respect to the floor structure arrangement 7 and away from the floor surface 9. The side walls 11 have an entrance opening 15 so that the compartment interior space 5 is accessible for cargo receiving devices 3 from outside the cargo compartment 1.

The floor surface 9 faces the compartment interior space 5 and is configured to support cargo receiving devices 3 loaded into the cargo compartment 1. The floor structure arrangement 7 comprises an air cushion device 17 having a plurality of cushion nozzles 19 provided and distributed in the floor surface 9. The cushion nozzles 19 are configured to blow air up from the floor surface 9 in a direction perpendicular to the floor surface 9. The air cushion device 17 comprises a cushion controlling unit 21 controlling the air stream blowing out of the cushion nozzles 19 in dependence of the position of a cargo receiving device 3 detected by a position sensor 23.

The cargo compartment 1 further comprises a transport device 25 configured to transport a cargo receiving device 3 through the cargo compartment 1 to a desired position. The transport device 25 comprises a plurality of transport nozzles 27 provided and distributed in the floor surface 9. The transport nozzles 27 are configured to blow air up from the floor surface 9 in a direction inclined between a direction perpendicular to the floor surface 9 and a direction parallel to the floor surface 9.

In order to move the cargo receiving device 3 in opposite directions, e.g. in and out of the cargo compartment 1, two groups 29a, 29b of transport nozzles 27 are provided in the floor surface 9, blowing air into different directions. A first group 29a of transport nozzles 27 is configured to blow air up from the floor surface 9 in a direction inclined between a direction perpendicular to the floor surface 9 and a first direction 31a parallel to the floor surface 9. A second group 29b of transport nozzles 27 is configured to blow air up from the floor surface 9 in a direction inclined between a direction perpendicular to the floor surface 9 and a second direction 31b parallel to the floor surface 9 opposite to said first direction 31a. Alternatively, the transport nozzles 27 may be configured to adjust the direction in which air is blown out between the directions of the first and the second group 29a, 29b of transport nozzles 27.

The transport device 25 further comprises a transport controlling unit 33 configured to control the air stream and the direction of the air blowing out of the transport nozzles 27 in dependence of the position of the cargo receiving device detected by the position sensor 23.

The cargo compartment 1 additionally comprises a locking device 35 configured to lock a cargo receiving device 3 in a desired position in the cargo compartment 1. The locking device 35 comprises a plurality of vacuum suction nozzles 37 provided in the floor surface 9 and configured to suck off the air above the floor surface 9. In the present embodiment said vacuum suction nozzles 37 are incorporated in the cushion nozzles 19, so that the cushion nozzles 19 are capable of both blow out air and suck off air, depending on whether the a cargo receiving device 3 is intended to be supported during transport or locked in a desired position. The locking device 35 further comprises a locking controlling unit 39 configured to control the air stream sucked in the vacuum suction nozzles 37 in dependence of the position of a cargo receiving device 3 detected by the position sensor 23.

An embodiment of the method for loading a cargo compartment 1 of an aircraft with a cargo receiving device 3 is carried out as follows. First, a cargo compartment according to the above described embodiment is provided. Then, a cargo receiving device 3 configured to receive and secure a certain amount of cargo and to be accommodated in the cargo compartment 1 of an aircraft is provided, said cargo receiving device 3 comprising a base structure arrangement 41 having a lower contact surface 43.

Subsequently, an air cushion is established above the floor surface 9 of flue cargo compartment 1 by initiating the air cushion device 17 to blow air out of the cushion nozzles 19 into the compartment interior space 5. Then, the cargo receiving device 3 is positioned in the cargo compartment 1 with the lower contact surface 43 on said air cushion spaced from the floor surface 9, e.g. by means of a cargo conveyer device.

Afterwards, the cargo receiving device 3 is moved on the air cushion to a desired position in the cargo compartment by means of a transport device 25 of the cargo compartment 1 described above, wherein the inclined stream of air blowing out of the transport nozzles 27 engages the lower contact surface 43 of the cargo receiving device 3 and pushes said cargo receiving device 3 in the desired direction along the floor surface 9.

Finally the cargo receiving device 3 is locked in its desired position in the cargo compartment 1 by means of a locking device 35 of the cargo compartment 1 described above, wherein vacuum suction is applied between the lower contact surface 43 of the cargo receiving device 3 and the floor surface 9 by the vacuum suction nozzles 37, i.e. by the cushion nozzles 19, so that the lower contact surface 43 is pressed onto the floor surface 9, thereby holding preventing movement of the cargo receiving device 3.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A cargo compartment configured to be installed in a vehicle, and to accommodate a plurality of cargo receiving devices, said cargo compartment defining a compartment interior space, and the cargo compartment comprising:
   a floor structure arrangement having a floor surface facing the compartment interior space and adapted to support cargo receiving devices loaded into the cargo compartment, the floor structure arrangement including an air cushion device having a plurality of cushion nozzles arranged in the floor structure arrangement and distributed over the floor surface,
   two opposite side walls extending laterally of the floor structure arrangement away from the floor surface, said side walls including an entrance opening providing access to the compartment interior space, and
   a transport device configured to transport a cargo receiving device through the cargo compartment to a desired position,
   wherein the transport device comprises a plurality of transport nozzles arranged in the floor structure arrangement and distributed over the floor surface,
   wherein the plurality of transport nozzles blow air from the floor surface into the compartment interior space in a direction inclined between a direction perpendicular to the floor surface and a direction parallel to the floor surface,
   wherein the plurality of transport nozzles are configured such that the direction in which air is blown is adjustable between the direction inclined between the direction perpendicular to the floor surface and the direction parallel to the floor surface,
   wherein the plurality of cushion nozzles are formed as the plurality of transport nozzles, and
   wherein the plurality of vacuum suction nozzles are incorporated in the plurality of transport nozzles.

2. The cargo compartment according to claim 1, wherein the air cushion device comprises:
   one or more position sensors configured to detect the position of a cargo receiving device in the cargo compartment, and
   a cushion controlling unit controlling the air stream blowing out of the plurality of cushion nozzles based on the position of the cargo receiving device detected by the one or more position sensors.

3. The cargo compartment according to claim 1, wherein a first group of the plurality of transport nozzles blow air from the floor surface in a direction inclined between a direction perpendicular to the floor surface and a first direction parallel to the floor surface.

4. The cargo compartment according to claim 1, wherein the transport device comprises:
   one or more position sensors to detect the position of a cargo receiving device in the cargo compartment, and
   a transport controlling unit configured to control the air stream and the direction of the air blowing out of the transport nozzles based on the position of the cargo receiving device detected by the one or more position sensors.

5. The cargo compartment according to claim 1, wherein the cargo compartment comprises a locking device to lock a cargo receiving device in a desired position in the cargo compartment.

6. The cargo compartment according to claim 5, wherein the locking device comprises a plurality of vacuum suction nozzles arranged in the floor structure arrangement and distributed over the floor surface to suck off air from above the floor surface.

7. The cargo compartment according to claim 6, wherein the locking device comprises:
   one or more position sensors to detect the position of a cargo receiving device in the cargo compartment, and
   a locking controlling unit configured to control the suction action of the vacuum suction nozzles based on the position of the cargo receiving device detected by the one or more position sensors.

8. The cargo compartment according to claim 6, wherein the plurality of vacuum suction nozzles are incorporated in or formed by at least some of the plurality of cushion nozzles.

9. The cargo compartment according to claim 1, wherein the plurality of transport nozzles are configured such that the direction in which air is blown is adjustable between a direction inclined between a direction perpendicular to the floor surface and a second direction parallel to the floor surface opposite to said first direction.

10. The cargo compartment according to claim 1, wherein a second group of the plurality of transport nozzles blow air from the floor surface in a direction inclined between a direction perpendicular to the floor surface and a second direction parallel to the floor surface opposite to said first direction.

11. The cargo compartment of claim 1, wherein the cargo compartment is configured to be in installed in an aircraft.

* * * * *